(12) United States Patent
Konishi et al.

(10) Patent No.: US 8,519,559 B2
(45) Date of Patent: Aug. 27, 2013

(54) SPIRAL TYPE MEMBRANE ELEMENT, AND SPIRAL TYPE MEMBRANE FILTERING DEVICE HAVING THE SAME

(75) Inventors: Takahisa Konishi, Ibaraki (JP); Kouji Maruyama, Ibaraki (JP); Toshiki Kouno, Ibaraki (JP); Keisuke Hirano, Ibaraki (JP); Akira Ootani, Ibaraki (JP); Hiroshi Yoshikawa, Ibaraki (JP); Norio Ikeyama, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 377 days.

(21) Appl. No.: 12/808,405

(22) PCT Filed: Dec. 16, 2008

(86) PCT No.: PCT/JP2008/072880
§ 371 (c)(1),
(2), (4) Date: Jun. 16, 2010

(87) PCT Pub. No.: WO2009/078413
PCT Pub. Date: Jun. 25, 2009

(65) Prior Publication Data
US 2011/0121574 A1    May 26, 2011

(30) Foreign Application Priority Data
Dec. 17, 2007  (JP) ................................. 2007-324906

(51) Int. Cl.
*F03B 13/00*    (2006.01)
(52) U.S. Cl.
USPC .......................................................... 290/54
(58) Field of Classification Search
USPC ............... 290/54–55, 43–44, 52, 50
See application file for complete search history.

(56) References Cited

U.S. PATENT DOCUMENTS 3,554,378 A * 1/1971 Kohl ........................ 210/321.83
4,235,723 A * 11/1980 Bartlett, Jr. ............... 210/321.83

(Continued)

FOREIGN PATENT DOCUMENTS

| CN | 1264031 | 8/2000 |
| CN | 1385542 | 12/2002 |

(Continued)

OTHER PUBLICATIONS

International Search Report issued in the corresponding PCT Application No. PCT/JP2008/072880, dated Mar. 17, 2009.

(Continued)

*Primary Examiner* — Jean F Duverne
(74) *Attorney, Agent, or Firm* — Knobbe, Martens, Olson & Bear, LLP

(57) ABSTRACT

Provided are a spiral type membrane element that can re-collect the electric power that is used in a good manner, and a spiral type membrane filtering device having the same. The spiral type membrane element comprises a power generating section that generates electric power by using a liquid, and an electric power outputting section that outputs, either in a wired manner or in a wireless manner, the electric power supplied from said power generating section. The electric power that is generated in the power generating section using the liquid (raw water, permeated water, or concentrated water) can be output from the electric power outputting section in a wired manner or in a wireless manner. Therefore, the electric power that is output from the aforesaid electric power outputting section can be used in an electric component disposed outside or can be stored into a capacitor section disposed outside.

5 Claims, 6 Drawing Sheets

(56) References Cited

U.S. PATENT DOCUMENTS

| | | | |
|---|---|---|---|
| 4,855,058 A * | 8/1989 | Holland et al. | 210/652 |
| 5,137,639 A | 8/1992 | Guzik et al. | |
| 5,240,612 A | 8/1993 | Grangeon et al. | |
| 6,132,613 A | 10/2000 | Hopkin et al. | |
| 6,139,750 A | 10/2000 | Graham | |
| 6,757,173 B2 | 6/2004 | Yamaguchi | |
| 7,084,521 B1 * | 8/2006 | Martin | 290/54 |
| 7,384,549 B2 * | 6/2008 | de los Reyes et al. | 210/321.72 |
| 7,481,917 B2 * | 1/2009 | Ikeyama et al. | 210/85 |
| 7,812,472 B2 * | 10/2010 | Allaei | 290/44 |
| 7,816,802 B2 * | 10/2010 | Green | 290/55 |
| 7,891,940 B2 * | 2/2011 | Sack | 415/7 |
| 2005/0194317 A1 | 9/2005 | Ikeyama et al. | |
| 2007/0172714 A1 * | 7/2007 | Tsuchino et al. | 429/34 |
| 2007/0209977 A1 | 9/2007 | Wilf et al. | |
| 2008/0156731 A1 | 7/2008 | Gordon | |
| 2008/0296208 A1 | 12/2008 | Ikeyama et al. | |
| 2009/0032477 A1 | 2/2009 | Ikeyama et al. | |
| 2009/0130523 A1 * | 5/2009 | Sugiyama et al. | 429/31 |
| 2011/0079546 A1 | 4/2011 | Konishi et al. | |
| 2011/0121574 A1 | 5/2011 | Konishi et al. | |
| 2011/0233933 A1 | 9/2011 | Rapoport | |
| 2012/0000851 A1 | 1/2012 | Vuong et al. | |

FOREIGN PATENT DOCUMENTS

| | | |
|---|---|---|
| CN | 1993171 | 7/2007 |
| GB | 1 603 746 | 11/1981 |
| JP | 54-005875 | 1/1979 |
| JP | 61-093274 | 5/1986 |
| JP | U 62-13502 | 1/1987 |
| JP | 08-206639 | 8/1996 |
| JP | 09-126854 | 5/1997 |
| JP | 2000-240558 | 9/2000 |
| JP | 2001-276816 | 10/2001 |
| JP | 2006-170903 | 6/2006 |
| JP | 2006-343118 | 12/2006 |
| JP | 2007-098278 | 4/2007 |
| JP | 2007-127105 | 5/2007 |
| JP | 2007-527318 | 9/2007 |
| JP | 2009-291743 | 12/2009 |
| JP | 2009-291745 | 12/2009 |
| WO | WO 2007/030647 | 3/2007 |
| WO | WO 2007/108977 | 9/2007 |
| WO | WO 2009/078413 | 6/2009 |

OTHER PUBLICATIONS

File History of the related U.S. Appl. No. 12/808,396, as of Jun. 16, 2010.

File History of the related U.S. Appl. No. 12/808,414, as of Jun. 16, 2010.

Office Action issued by the Australian Government IP Australia dated Feb. 13, 2012 for the counterpart Australian Patent App. No. 2008339452.

Office Action issued by the Australian Government IP Australia dated Mar. 24, 2011 for the counterpart Australian Patent Application No. 2008339452.

Office Action issued by the Chinese Intellectual Property Office on Apr. 5, 2012 in the corresponding patent application No. 200880119498.6.

Notification of Reasons for Refusal dated Dec. 11, 2012 in corresponding Japanese patent application No. 2008-319816.

Extended European Search Report issued in corresponding patent application No. 08862595.9, dated Aug. 6, 2012.

Notification of Reasons for Refusal dated Jun. 21, 2013 in corresponding Japanese patent application No. 2008-319816.

* cited by examiner

SPIRAL TYPE MEMBRANE ELEMENT, AND SPIRAL TYPE MEMBRANE FILTERING DEVICE HAVING THE SAME

This application is the U.S. National Phase under 35 U.S.C. §371 of International Application No. PCT/JP2008/072880, filed Dec. 16, 2008, which claims priority to the Japanese Patent Application No. 2007-324906, filed Dec. 17, 2007. The International Application was not published in English under PCT Article 21(2).

TECHNICAL FIELD

The present invention relates to a spiral type membrane element in which a separation membrane, a supply side flow path material, and a permeation side flow path material in a laminated state are wound in a spiral form around a central pipe, and a permeated liquid that is filtered by the separation membrane from a raw liquid supplied via a raw liquid flow path formed by the supply side flow path material is guided to the central pipe via the permeation side flow path material, and a spiral type membrane filtering device having the same.

BACKGROUND ART

A spiral type membrane filtering device (hereinafter simply referred to as the "membrane filtering device" is known that is constructed by plurally arranging the aforesaid spiral type membrane element (hereinafter simply referred to as the "membrane element") in a line and connecting between the central pipes of adjacent membrane elements with use of an interconnector (connecting section). The plurality of membrane elements that are connected in this manner are housed, for example, in an outer vessel formed of resin, and are treated as one membrane filtering device (for example, refer to Patent Document 1).

A membrane filtering device of this kind is generally used for obtaining purified permeated water (permeated liquid) by filtering raw water (raw liquid) such as waste water or sea water. Particularly, in a large-scale plant or the like, numerous membrane filtering devices are held by a rack referred to as a train. For example, in a large-scale plant in which about 10000 tons of raw water are processed per day, 1000 or more membrane filtering devices are used.

Patent Document 1: Japanese Unexamined Patent Publication No. 2007-527318

DISCLOSURE OF THE INVENTION

Problems to be Solved by the Invention

When raw water is processed using a membrane filtering device described above, the electric power to be used occupies a major part of the processing costs thereof. In particular, in a large-scale plant described above, a considerable amount of electric power will be needed for processing the raw water. Therefore, if the electric power that is used can be re-collected in a good manner, the production costs also can be reduced.

The present invention has been made in view of the aforementioned circumstances, and an object thereof is to provide a spiral type membrane element that can re-collect the electric power that is used in a good manner, and a spiral type membrane filtering device having the same.

Means for Solving the Problems

A spiral type membrane element according to a first aspect of the present invention relates to the spiral type membrane element in which a separation membrane, a supply side flow path material, and a permeation side flow path material in a laminated state are wound in a spiral form around a central pipe, and a permeated liquid that is filtered by said separation membrane from a raw liquid supplied via a raw liquid flow path formed by said supply side flow path material is guided to said central pipe via said permeation side flow path material, comprising:

a power generating section that generates electric power by using said liquid; and an electric power outputting section that outputs, either in a wired manner or in a wireless manner, the electric power supplied from said power generating section.

According to the present invention, the electric power that is generated in the power generating section using the liquid can be output from the electric power outputting section in a wired manner or in a wireless manner. Therefore, the electric power that is output from the aforesaid electric power outputting section can be used in an electric component disposed outside or can be stored into a capacitor section disposed outside, so that the electric power that is used can be re-collected in a good manner.

A spiral type membrane element according to a second aspect of the present invention relates to the spiral type membrane element in which a separation membrane, a supply side flow path material, and a permeation side flow path material in a laminated state are wound in a spiral form around a central pipe, and a permeated liquid that is filtered by said separation membrane from a raw liquid supplied via a raw liquid flow path formed by said supply side flow path material is guided to said central pipe via said permeation side flow path material, comprising:

a power generating section that generates electric power by using said liquid; and a capacitor section that stores the electric power supplied from said power generating section.

According to the present invention, the electric power that is generated in the power generating section using the liquid can be stored in a capacitor section, so that the electric power that is used can be re-collected in a good manner, and each section provided in the spiral type membrane element can be operated using the electric power.

A spiral type membrane element according to a third aspect of the present invention relates to the spiral type membrane element, wherein said power generating section generates electric power by a fluid pressure of said liquid.

According to the present invention, when the liquid is flowing within the spiral type membrane element, electric power can be generated efficiently by the fluid pressure of the liquid.

A spiral type membrane element according to a fourth aspect of the present invention relates to the spiral type membrane element, comprising a rotor that rotates by the fluid pressure of said liquid, wherein said power generating section generates electric power on the basis of rotation of said rotor.

According to the present invention, the rotor rotates by the fluid pressure of liquid when the liquid is flowing within the spiral type membrane element, whereby power generation is carried out in the power generating section on the basis of the rotation. Therefore, the power generation can be carried out efficiently with a simple construction as providing a rotor that rotates by the fluid pressure of the liquid.

A spiral type membrane element according to a fifth aspect of the present invention relates to the spiral type membrane element, wherein said rotor is disposed in said central pipe.

According to the present invention, the rotor rotates by the fluid pressure of permeated liquid when the permeated liquid is flowing within the central pipe, whereby power generation is carried out in the power generating section on the basis of the rotation. Therefore, the power generation can be carried out efficiently with a simple construction as providing a rotor in the central pipe.

A spiral type membrane element according to a sixth aspect of the present invention relates to the spiral type membrane element, wherein said rotor is disposed in said raw liquid flow path.

According to the present invention, the rotor rotates by the fluid pressure of raw liquid when the raw liquid is flowing within the raw liquid flow path, whereby power generation is carried out in the power generating section on the basis of the rotation. Therefore, the power generation can be carried out efficiently with a simple construction as providing a rotor in the raw liquid flow path. Further, generally, the raw liquid flowing within the raw liquid flow path has a higher fluid pressure than the permeated liquid flowing within the central pipe, so that the power generation can be carried out more efficiently by providing a rotor in the raw liquid flow path.

A spiral type membrane filtering device according to a seventh aspect of the present invention relates to the spiral type membrane filtering device comprising the spiral type membrane element.

According to the present invention, the electric power that is generated in the power generating section using the liquid can be output from the electric power outputting section in a wired manner or in a wireless manner. Therefore, the electric power that is output from the aforesaid electric power outputting section can be used in an electric component disposed outside or can be stored into a capacitor section disposed outside, so that the electric power that is used can be re-collected in a good manner.

Effects of the Invention

According to the present invention, the electric power generated in the power generating section using the liquid can be outputted either in a wired manner or in a wireless manner from the electric power outputting section, so that the electric power that is used can be re-collected in a good manner. Further, according to the present invention, the electric power generated in the power generating section using the liquid can be stored in the capacitor section, so that the electric power that is used can be re-collected in a good manner.

BRIEF DESCRIPTION OF THE DRAWINGS

FIG. 3 is a schematic perspective view illustrating one example of an internal construction of a central pipe, showing a state in which the internal construction is seen through.

FIG. 5 is a schematic perspective view illustrating one example of an internal construction of a spiral type membrane element according to the second embodiment of the present invention, showing a state in which the internal construction is seen through.

FIG. 6 is a schematic perspective view illustrating one example of an internal construction of a spiral type membrane element according to the third embodiment of the present invention, showing a state in which the internal construction is seen through.

Figure 1:
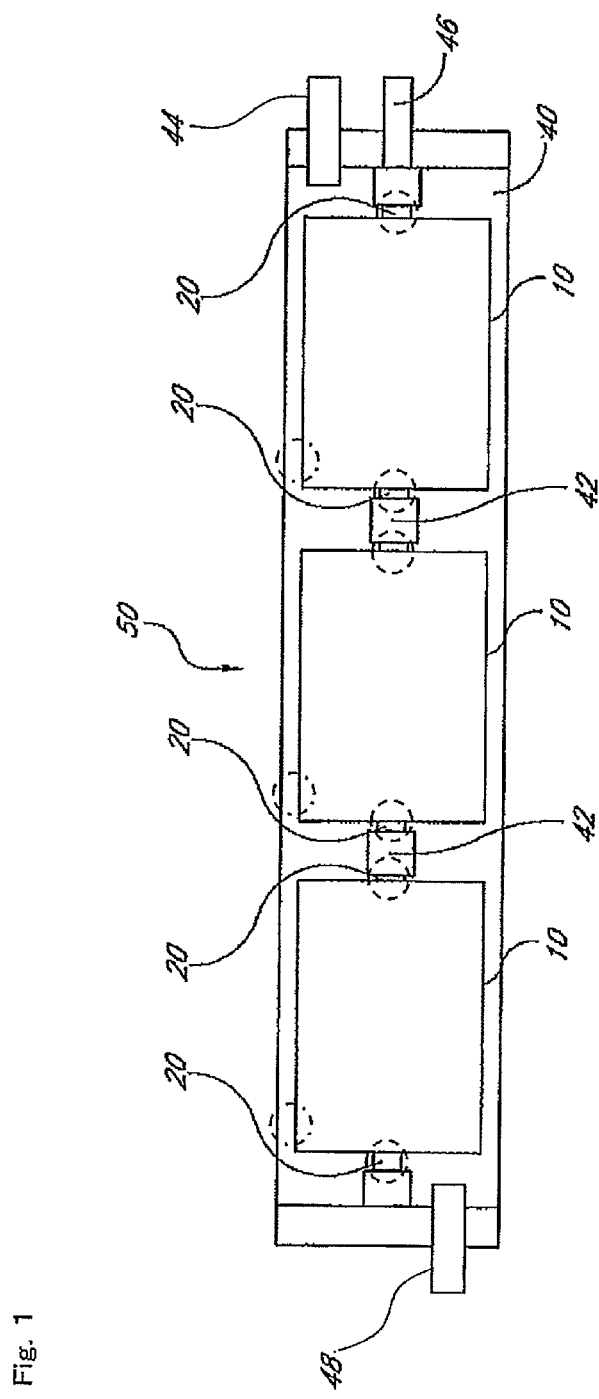
FIG. 1 is a schematic cross-sectional view illustrating one example of a spiral type membrane filtering device having a spiral type membrane element according to the first embodiment of the present invention.

DESCRIPTION OF THE SYMBOLS 10 spiral type membrane element
12 separation membrane
14 permeation side flow path material
16 membrane member
18 supply side flow path material
20 central pipe
21 blade wheel
25 coil
26 power generating section
27 space
28 raw water flow path
31 battery
32 flow rate sensor
33 electric conductivity sensor
34 temperature sensor
35 fouling detection sensor
36 communication section
37 RFID tag
36 communication device
39 electric power outputting section
40 outer vessel
42 interconnector
44 concentrated water flow outlet
46 permeated water flow outlet
48 raw water flow inlet
50 spiral type membrane filtering device
121 blade wheel
125 coil
126 power generating section
221 blade wheel
225 coil
226 power generating section

BEST MODES FOR CARRYING OUT THE INVENTION

First Embodiment

Figure 2:
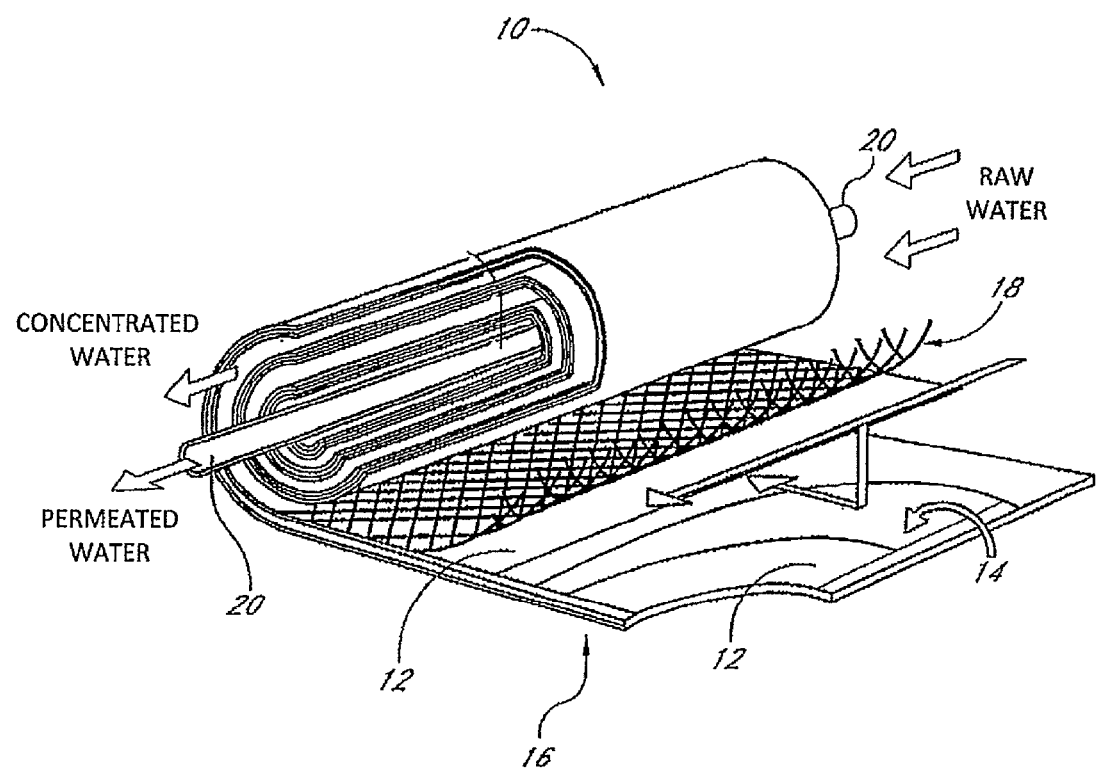
FIG. 2 is a perspective view illustrating an internal construction of the spiral type membrane element of FIG. 1.

FIG. 1 is a schematic cross-sectional view illustrating one example of a spiral type membrane filtering device 50 having a spiral type membrane element 10 according to the first embodiment of the present invention. Also, FIG. 2 is a perspective view illustrating an internal construction of a spiral type membrane element 10 of FIG. 1. This spiral type membrane filtering device 50 (hereinafter simply referred to as the "membrane filtering device 50") is constructed by arranging a plurality of spiral type membrane elements (hereinafter simply referred to as the "membrane elements 10") in a line within an outer vessel 40.

The outer vessel 40 is a tube body made of resin, which is referred to as a pressure-resistant vessel, and is formed, for example, with FRP (Fiberglass Reinforced Plastics). A raw water flow inlet 48 through which a raw water (raw liquid) such as waste water or sea water flows in is formed at one end of the outer vessel 40, and the raw water that flows in through the raw water flow inlet 48 is filtered by a plurality of membrane elements 10, whereby a purified permeated water (permeated liquid) and a concentrated water (concentrated liquid), which is a raw water after the filtration, can be obtained. A permeated water flow outlet 46 through which the permeated water flows out and a concentrated water flow outlet 44 through which the concentrated water flows out are formed at the other end of the outer vessel 40.

Referring to FIG. 2, the membrane element 10 is an RO (Reverse Osmosis) element that is formed in such a manner that a separation membrane 12, a supply side flow path material 18, and a permeation side flow path material 14 in a laminated state are wound in a spiral form around a central pipe 20.

More specifically, onto both sides of the permeation side flow path material 14 having a rectangular shape composed of a net-shaped member made of resin, the separation membranes 12 having the same rectangular shape are superposed and the three sides thereof are bonded, whereby a bag-shaped membrane member 16 having an opening at one side is formed. Then, the opening of this membrane member 16 is mounted onto the outer circumferential surface of the central pipe 20, and is wound around the central pipe 20 together with the supply side flow path material 18 composed of a net-shaped member made of resin, whereby the membrane element 10 is formed. The separation membrane 12 is formed, for example, by sequentially laminating a porous supporter and a skin layer (dense layer) on a non-woven cloth layer.

When a raw water is supplied through one end of the membrane element 10 formed in the above-described manner, the raw water passes within the membrane element 10 via a raw water path formed by the supply side flow path material 18 functioning as a raw water spacer. During this time, the raw water is filtered by the separation membrane 12, and the permeated water that is filtered from the raw water penetrates into a permeated water flow path formed by the permeation side flow path material 14 functioning as a permeated water spacer.

Thereafter, the permeated water that has penetrated into the permeated water flow path flows to the central pipe 20 side by passing through the permeated water flow path, and is guided into the central pipe 20 through a plurality of water-passing holes (not illustrated) formed on the outer circumferential surface of the central pipe 20. This allows that, through the other end of the membrane element 10, the permeated water flows out via the central pipe 20, and the concentrated water flows out via the raw water flow path formed by the supply side flow path material 18.

As shown in FIG. 1, regarding the plurality of membrane elements 10 that are housed within the outer vessel 40, the central pipes 20 of adjacent membrane elements 10 are connected with each other by a pipe-shaped interconnector (connecting section) 42. Therefore, the raw water that has flowed in through the raw water flow inlet 48 flows into the raw water flow path sequentially from the membrane element 10 on the raw water flow inlet 48 side, and the permeated water that has been filtered from the raw water by each membrane element 10 flows out through the permeated water flow outlet 46 via one central pipe 20 connected by the interconnector 42. On the other hand, the concentrated water that has been concentrated by filtration of the permeated water by passing through the raw water flow path of each membrane element 10 flows out through the concentrated water flow outlet 44.

Figure 3:
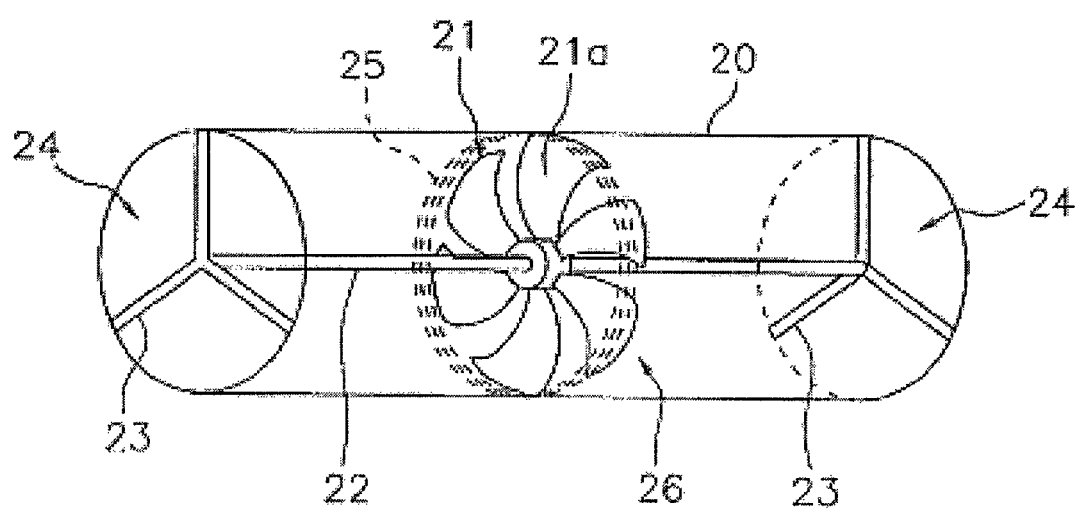

FIG. 3 is a schematic perspective view illustrating one example of an internal construction of the central pipe 20, showing a state in which the internal construction is seen through. In this example, within the central pipe 20, there is provided a blade wheel 21 serving as a rotor that rotates by the fluid pressure of the permeated water that flows within the central pipe 20. However, the rotor is not limited to the blade wheel 21, so that those having various shapes can be adopted as well. Further, it is possible to adopt a construction in which the central pipe 20 is made, for example, of a circular pipe having a diameter of 20 mm to 50 mm. However, the present invention is not limited to such a construction, so that a central pipe 20 having a smaller diameter or having a larger diameter can also be adopted.

Within the central pipe 20, there is disposed a main shaft 22 along the central axial line thereof, and the two ends of the main shaft 22 are supported by a supporting section 23 at the two ends of the central pipe 20. The supporting section 23 is made of a plurality of rod materials that extend radially relative to the central axial line of the central pipe 20, and the space between these rod materials form a water-passing hole 24 for passing the permeated water therethrough.

The blade wheel 21 has plural sheets of blades 21a the respective tip ends of which extend up to the position close to the inner circumferential surface of the central pipe 20. Therefore, the permeated water that has flowed into the central pipe 20 via the water-passing hole 24 at one end of the central pipe 20 passes within the central pipe 20 while being in contact with the blades 21a of the blade wheel 21, and flows out via the water-passing hole 24 at the other end of the central pipe 20, whereby the blade wheel 21 rotates by the fluid pressure of the permeated water that acts on the blades 21a.

A coil 25 is formed by winding a metal wire around the blade wheel 21 in the central pipe 20. Also, a magnet (not illustrated) is mounted at the tip end of each blade 21a of the blade wheel 21. Such a construction allows that, when the blade wheel 21 rotates, the magnetic field formed by the magnet around the coil 25 changes, whereby an induced electric current flows through the coil 25 by what is known as the electromagnetic induction. In other words, the magnet mounted on the blade wheel 21 and the coil 25 constitute a power generating section 26 that generates electric power based on the rotation of the blade wheel 21. However, the construction in which electric power is generated using a rotor that rotates by the fluid pressure of liquid is not limited to the aforementioned construction using the blade wheel 21, so that power generation can be carried out in a good manner by adopting a construction using a rotary magnet power generator as disclosed in Japanese Patent Application Laid-open No. 2006-141155 or a non-contact type rotor as disclosed in Japanese Patent Application Laid-open No. 2000-146639.

Figure 4:
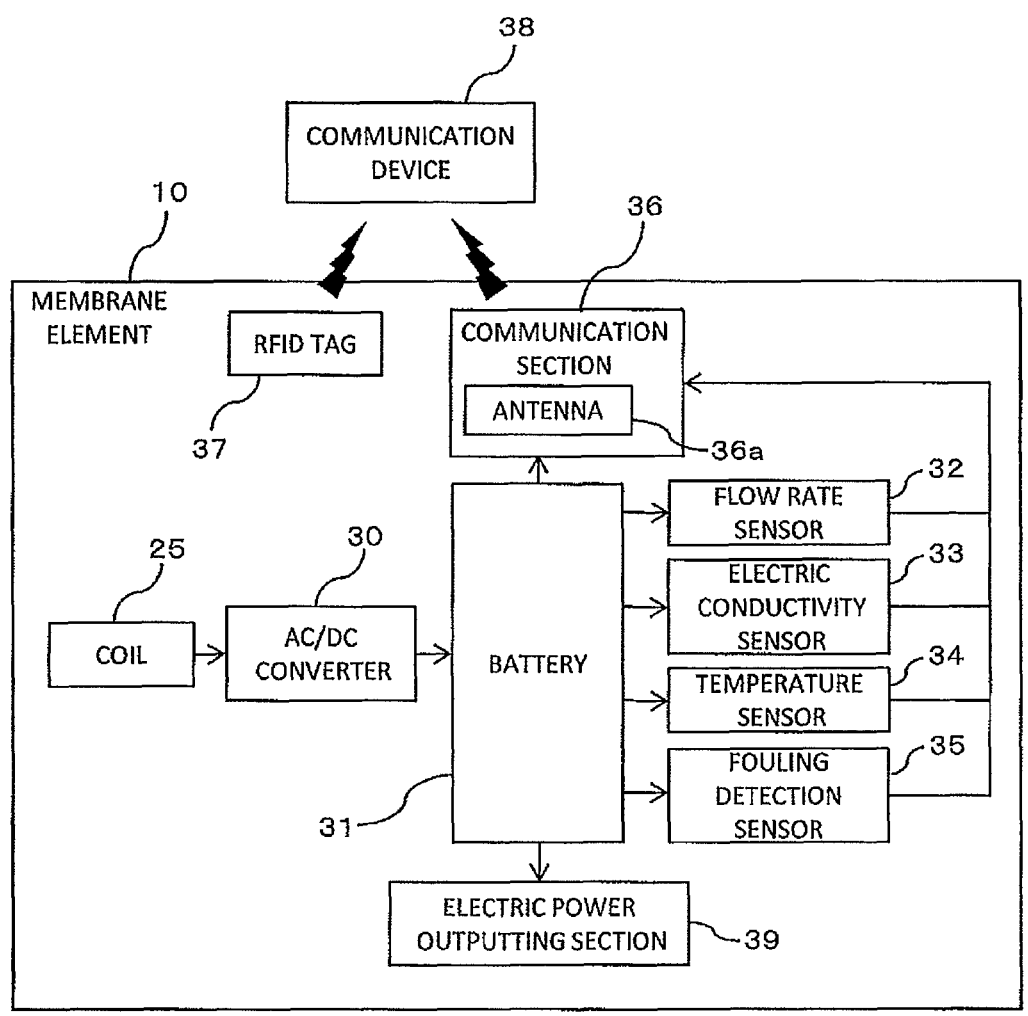
FIG. 4 is a block diagram showing an electric construction of the spiral type membrane filtering device of FIG. 1.

FIG. 4 is a block diagram showing an electric construction of the spiral type membrane filtering device 50 of FIG. 1. This membrane filtering device 50 includes, besides the coil 25, an AC/DC converter 30, a battery 31, a flow rate sensor 32, an electric conductivity sensor 33, a temperature sensor 34, a fouling detection sensor 35, a communication section 36, an RFID tag 37, an electric power outputting section 39, and others.

Among the sections provided in the membrane filtering device 50, the coil 25, the AC/DC converter 30, the battery 31, the flow rate sensor 32, the electric conductivity sensor 33, the temperature sensor 34, the fouling detection sensor 35, the communication section 36, and the electric power outputting section 39 are mounted on the central pipe 20. On the other hand, the RFID tag 37 is mounted on a membrane member 16 that forms the outer circumferential surface of the membrane element 10. However, the present invention is not limited to such a construction, so that it is possible to adopt a construction in which the power generating section 26, the AC/DC converter 30, the battery 31, the flow rate sensor 32, the electric conductivity sensor 33, the temperature sensor 34, the fouling detection sensor 35, the communication section 36, the electric power outputting section 39, and the like are mounted on a part in the membrane element 10 other than the central pipe 20, for example, on an end member (seal carrier or telescope prevention member) or the like mounted on an end of the membrane element 10. Further, it is possible to adopt a construction in which the RFID tag 37 is mounted on a part in the membrane element 10 other than the membrane member 16, for example, on the central pipe 20, the aforesaid end member, or the like.

The induced current generated in the coil 25 is converted from an alternating current (AC) to direct current (DC) by the AC/DC converter 30, and is supplied to the battery 31. The battery 31 is made of a secondary battery and constitutes a capacitor section that stores electric power that is supplied from the power generating section 26 via the AC/DC converter 30. In this manner, the electric power that is generated in the power generating section 26 using the liquid (in this example, the permeated water) flowing within the membrane element 10 can be stored in the battery 31, so that the electric power that is used can be re-collected in a good manner, and each section provided in the membrane element 10 can be operated using the electric power.

The electric power stored in the battery 31 is supplied not only to various sensors such as the flow rate sensor 32, the electric conductivity sensor 33, the temperature sensor 34, and the fouling detection sensor 35 provided in the membrane filtering device 50 but also to other electric components such as the communication section 36. The other electric components may include, for example, a position detection section such as a GPS (Global Positioning System).

The flow rate sensor 32, the electric conductivity sensor 33, the temperature sensor 34, and the fouling detection sensor 35 are sensors that respectively detect the property of the permeated water that flows within the central pipe 20. More specifically, the flow rate sensor 32 has a construction including the blade wheel 21, and detects the flow rate of the permeated water that flows within the central pipe 20 based on the rotation number of the blade wheel 21. In other words, the power generating section 26 constituted of the magnet mounted on the blade wheel 21 and the coil 25 generates electric power by using the blade wheel 21 of the flow rate sensor 32.

With such a construction, the blade wheel 21 provided in the flow rate sensor 32 rotates by the fluid pressure of permeated water when the permeated water is flowing within the central pipe 20, whereby the flow rate of the permeated water can be detected by the flow rate sensor 32 based on the rotation number thereof, and also power generation can be carried out in the power generating section 26 based on the rotation of the blade wheel 21. Therefore, the power generation can be carried out efficiently by using the blade wheel 21 provided in the flow rate sensor 32.

The electric conductivity sensor 33 is a sensor that detects the electric conductivity of the permeated water that flows within the central pipe 20. The temperature sensor 34 is a sensor that detects the temperature of the permeated water that flows within the central pipe 20, and can be constructed, for example, with a thermocouple. The fouling detection sensor 35 is a sensor that detects the fouling state of the permeated water that flows within the central pipe 20.

The communication section 36 has an antenna 36a, and constitutes a wireless transmitting section that wirelessly transmits detection signals from various sensors such as the flow rate sensor 32, the electric conductivity sensor 33, the temperature sensor 34, and the fouling detection sensor 35 to the communication device 38. The antenna 36a of the communication section 36 can be formed, for example, by winding a metal wire around the central pipe 20.

The RFID tag 37 is a wireless tag that is provided with a storage medium capable of storing data and can transmit and receive data to and from the communication device 38 by non-contact communication using an electromagnetic wave. This RFID tag 37 may be of an active type having a capacitor section or may be of a passive type that does not have a capacitor section but obtains electric power by generating electromagnetic induction based on the electromagnetic wave from the communication device 38.

The RFID tag 37 can store data related to the membrane element 10 on which the RFID tag 37 is mounted. The data stored in this RFID tag 37 may be, for example, position information of the membrane element 10, production history of the membrane element 10, performance data of the membrane element 10, the road map data of the membrane element 10, or the like.

The electric power outputting section 39 can be constructed, for example, by disposing an electrode at an end of the central pipe 20 as shown in a circular region depicted by a broken line in FIG. 1. Namely, by electrically connecting the battery 31 to an electric component, a capacitor section, or the like that is disposed outside of the membrane filtering device 50 in a wired manner via the electrode, the electric power stored in the battery 31 can be output to the outside. This allows that the electric power that is output from the electric power outputting section 39 can be used in an electric component disposed outside or can be stored into a capacitor section disposed outside, so that the electric power that is used can be re-collected in a good manner.

However, the electric power outputting section 39 is not limited to the one constructed by an electrode disposed at an end of the central pipe 20 as shown above, so that various other constructions can be adopted as long as they are a construction in which the electric power generated in the power generating section 26 of the membrane element 10 can be output to the outside of the membrane filtering device 50. For example, it is possible to adopt a construction in which the electric power outputting section 39 is constructed by disposing an electrode on an outer circumferential surface of the membrane element 10 as shown in a circular region depicted by a one-dot chain line in FIG. 1, and the electric power generated in the power generating section 26 is output to the outside of the membrane filtering device 50 via an outer vessel 40 that is in contact with the electrode.

Further, in the above-described example, description has been given on a construction in which the electric power supplied from the power generating section 26 is output from the electric power outputting section 39 in a wired manner. However, the present invention is not limited to such a construction, so that it is possible to adopt a construction in which the electric power supplied from the power generating section 26 is output from the electric power outputting section 39 in a wireless manner. In this case, it is possible to adopt a construction in which the electric power outputting section 39 is provided with an antenna, or a construction in which the electric power is output using the antenna 36a of the communication section 36.

Further, in the above-described example, description has been given on a construction in which the electric power stored in the battery 31 is output to the outside from the electric power outputting section 39. However, the present invention is not limited to such a construction, so that it is possible to adopt a construction in which the electric power supplied from the power generating section 26 is directly output to the outside without the intermediary of a capacitor section such as the battery 31. In this case, it is possible to adopt a construction in which the electric power outputting section 39 is directly connected to the power generating section 26 (coil 25) or to the AC/DC converter 30.

Second Embodiment

In the first embodiment, description has been given on a construction in which power generation is carried out on the basis of the rotation of the rotor (blade wheel 21) disposed in the central pipe 20. In contrast, the second embodiment is different in that the rotor is disposed in the raw water flow path formed by the supply side flow path material 18.

Figure 5:
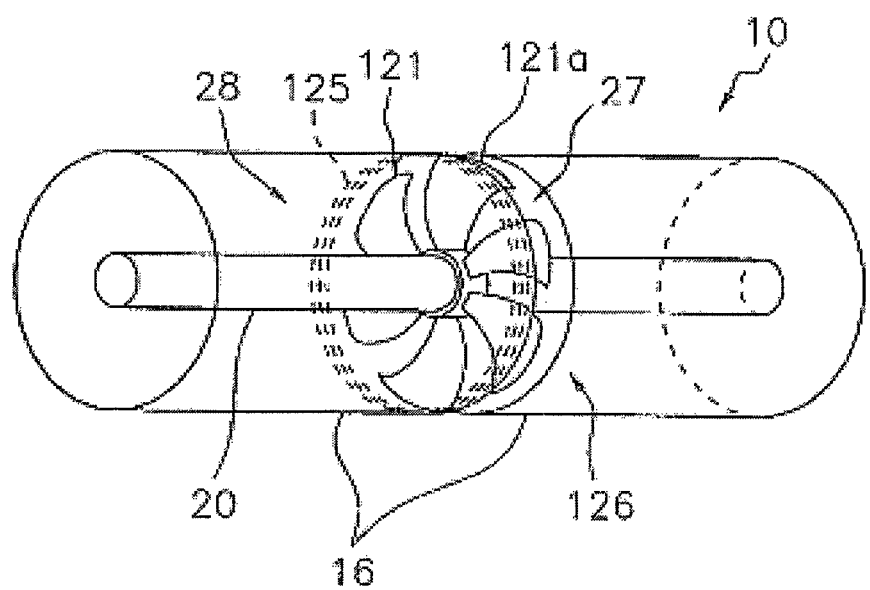

FIG. 5 is a schematic perspective view illustrating one example of an internal construction of a spiral type membrane element 10 according to the second embodiment of the present invention, showing a state in which the internal construction is seen through. In this example, the membrane member 16 wound around the central pipe 20 is split into two parts along the axial line direction of the central pipe 20, and a space 27 is formed between the end surfaces of these split membrane members 16. This space 27 is a region through which the raw water that flows from the raw water flow path 28 formed by the supply side flow path material 18 in one of the split membrane members 16 to the raw water flow path 28 in the other membrane member 16 passes, and constitutes a part of the aforesaid raw water flow path 28.

In the space 27, there is disposed a blade wheel 121 serving as a rotor that is mounted to be rotatable relative to the central pipe 20. This blade wheel 121 has plural sheets of blades 121a the respective tip ends of which extend up to the position close to the outer circumferential surface of the membrane element 10. Therefore, the raw water that flows from the raw water flow path 28 in one of the split membrane members 16 to the raw water flow path 28 in the other membrane member 16 passes within the space 27 while being in contact with the blades 121a of the blade wheel 121, whereby the blade wheel 121 rotates by the fluid pressure of the raw water that acts on the blades 121a.

A coil 125 is formed by winding a metal wire around the blade wheel 121 in one or both of the split membrane members 16. Also, a magnet (not illustrated) is mounted at the tip end of each blade 121a of the blade wheel 121. Such a construction allows that, when the blade wheel 121 rotates, the magnetic field formed by the magnet around the coil 125 changes, whereby an induced electric current flows through the coil 125 by what is known as the electromagnetic induction. In other words, the magnet mounted on the blade wheel 121 and the coil 125 constitute a power generating section 126 that generates electric power based on the rotation of the blade wheel 121.

With such a construction, the blade wheel 121 rotates by the fluid pressure of raw water when the raw water is flowing within the raw water flow path 28, whereby power generation is carried out in the power generating section 126 based on the rotation. Therefore, the power generation can be carried out efficiently with a simple construction such as providing the blade wheel 121 within the membrane element 10. However, the rotor is not limited to the blade wheel 121, and various shapes can be adopted for the rotor.

Here, the electric construction of the membrane filtering device 50 in the present embodiment is the same as the electric construction of the membrane filtering device 50 according to the first embodiment described with reference to FIG. 4, so that a detailed description thereof will be omitted here.

Third Embodiment

In the second embodiment, description has been given on a construction in which power generation is carried out on the basis of the rotation of the rotor (blade wheel 121) disposed in the middle part of the membrane element 10. In contrast, the third embodiment is different in that the rotor is disposed at an end of the membrane element 10.

Figure 6:
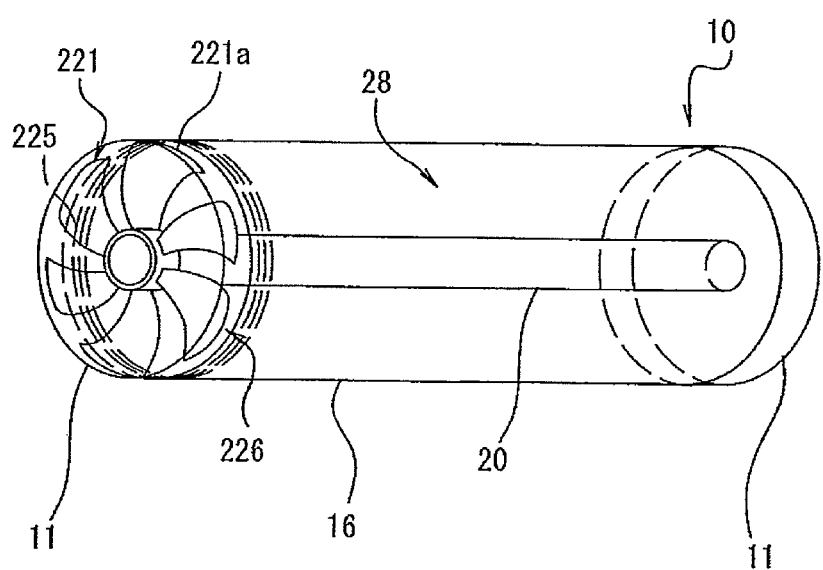

FIG. 6 is a schematic perspective view illustrating one example of an internal construction of a spiral type membrane element 10 according to the third embodiment of the present invention, showing a state in which the internal construction is seen through. In this example, an end member 11 functioning as a seal carrier that holds a sealing member (not illustrated) on the outer circumferential surface or a telescope prevention member that prevents the membrane member 16 from being telescopically deformed is mounted on both ends in the axial line direction of the membrane member 16 that is wound around the central pipe 20. The raw water that flows through the raw water flow path 28 formed by the supply side flow path material 18 in the membrane member 16 passes within these end members 11.

In the end member 11, there is disposed a blade wheel 221 serving as a rotor that is mounted to be rotatable relative to the central pipe 20. This blade wheel 221 has plural sheets of blades 221a the respective tip ends of which extend up to the position close to the outer circumferential surface of the membrane element 10. Therefore, the raw water that flows into or out of the raw water flow path 28 within the membrane member 16 passes through the end member 11 while being in contact with the blades 221a of the blade wheel 221, whereby the blade wheel 221 rotates by the fluid pressure of the raw water that acts on the blades 221a.

A coil 225 is formed by winding a metal wire around the two ends of the membrane members 16 that are adjacent to each end member 11. Also, a magnet (not illustrated) is mounted at the tip end of each blade 221a of the blade wheel 221. Such a construction allows that, when the blade wheel 221 rotates, the magnetic field formed by the magnet around the coil 225 changes, whereby an induced electric current flows through the coil 225 by what is known as the electromagnetic induction. In other words, the magnet mounted on the blade wheel 221 and the coil 225 constitute a power generating section 226 that generates electric power based on the rotation of the blade wheel 221.

Here, in the example of FIG. 6, the blade wheel 221 is illustrated only in the end member 11 that is mounted on one end of the membrane element 10, and the coil 225 is illustrated only at the aforesaid one end, so that illustration of the blade wheel 221 and the coil 225 disposed at the other end of the membrane element 10 is omitted. However, the present invention is not limited to the construction in which the blade wheel 221 and the coil 225 are disposed at both ends of the membrane element 10, so that it is possible to adopt a construction in which they are disposed only at one of the two ends.

With such a construction of the present embodiment, the blade wheel 221 rotates by the fluid pressure of raw water when the raw water is flowing within the raw water flow path 28, whereby power generation is carried out in the power generating section 226 based on the rotation. Therefore, the power generation can be carried out efficiently with a simple construction such as providing the blade wheel 221 to the end member 11. However, the rotor is not limited to the blade wheel 221, and various shapes can be adopted for the rotor.

Here, the electric construction of the membrane filtering device 50 in the present embodiment is the same as the electric construction of the membrane filtering device 50 according to the first embodiment described with reference to FIG. 4, so that a detailed description thereof will be omitted here.

In the above embodiments, electric power can be generated efficiently by performing power generation in the power generating section 26, 126, 226, using the liquid (raw water, permeated water, or concentrated water) detected by the sensor. Here, in general, the raw water flowing within the raw water flow path 28 has a larger fluid pressure than the permeated water flowing within the central pipe 20. Therefore, by providing a blade wheel 121, 221 within the raw water flow path 28 as in the second embodiment or the third embodiment, the power generation can be carried out more efficiently than in the case of the first embodiment.

Further, in the above embodiments, by mounting an RFID tag 37 onto the membrane element 10, management of the processing characteristics of the membrane element 10 can be carried out by storing data in advance in the RFID tag 37 and reading out the data from the outside. Therefore, the management can be carried out at a higher precision based on the data stored in the RFID tag 37 and the data obtained in each section such as the above-described sensor.

In the above embodiments, description has been given of a construction in which power generation is carried out by using a rotor such as the blade wheel 21, 121, 221 that is provided in the flow rate sensor 32. However, the present invention is not limited to such a construction so that it is possible to adopt a construction in which power generation is carried out by using a rotor provided separately from the flow rate sensor 32 or a construction in which power generation is carried out by using a different mechanism other than the rotor. The different mechanism may be, for example, a piezoelectric element or a strain gauge that generates voltage in accordance with the fluid pressure that is received from the liquid flowing within the membrane filtering device 50 such as the central pipe 20 or the raw water flow path 28. For example, electric power can be generated by disposing a piezoelectric element (piezo element) at a suitable position of the membrane filtering device 50. The piezoelectric element is preferably in a film form having bending property in view of the facility in placing or the efficiency of power generation. Further, the piezoelectric element can be placed at a site that is liable to receive the pressure of fluid or at a site where vibration is liable to be generated, such as an inner surface of the outer vessel 40 (pressure-resistant vessel), the outer cladding surface of the membrane element 10, the inside of the central pipe 20 or a connection part to the interconnector 42, the part at an end of the outer vessel 40 where the raw water flows in, the membrane holding member at an end of the membrane element 10, or the inside of the pipe in the membrane filtering device 50. Among these, in view of taking out and using electric power by electric wiring or wireless transmission, the piezoelectric element is preferably disposed on an inner surface of the outer vessel 40 or an outer cladding surface of the membrane element 10. Here, as the piezoelectric element, it is possible to adopt a suitable known technique such as a monomorph type, a bimorph type, or a lamination type.

Also, the present invention is not limited to a construction in which power generation is carried out using the fluid pressure of the liquid flowing within the membrane filtering device 50, so that it is possible to adopt a construction in which power generation is carried out in a different mode. For example, it is possible to conceive a construction in which, by generating numerous air bubbles in the permeated water that flows within the central pipe 20, power generation is carried out by using the energy of the air bubbles. In this case, an effect of cleaning the permeated water can be expected by action of the numerous air bubbles generated in the permeated water.

Further, in the above embodiments, description has been given of a case in which raw water such as waste water or sea water is filtered with use of a membrane filtering device 50; however, the present invention is not limited to this construction alone, so that it is possible to adopt a construction in which raw liquid other than water is filtered with use of the membrane filtering device 50.

The invention claimed is:

1. A spiral type membrane element in which a separation membrane, a supply side flow path material, and a permeation side flow path material in a laminated state are wound in a spiral form around a central pipe, and a permeated liquid that is filtered by said separation membrane from a raw liquid supplied via a raw liquid flow path formed by said supply side flow path material is guided to said central pipe via said permeation side flow path material, comprising:

a power generating section that generates electric power by using said raw liquid or said permeated liquid, wherein said power generating section generates electric power by a fluid pressure of said liquid, said power generating section comprising a rotor disposed in said raw liquid flow path, wherein said rotor rotates by the fluid pressure of said liquid, wherein said power generating section generates electric power on the basis of rotation of said rotor; and an electric power outputting section that outputs, either in a wired manner or in a wireless manner, the electric power supplied from said power generating section, wherein the electric power generated by the electric power generating section is output to the outside of the membrane filtering device.

2. A spiral type membrane filtering device comprising the spiral type membrane element according to claim 1.

3. The spiral type membrane element according to claim 1, wherein the electric power generated by the power generating section is sufficient to operate a spiral type membrane element.

4. A spiral type membrane element in which a separation membrane, a supply side flow path material, and a permeation side flow path material in a laminated state are wound in a spiral form around a central pipe, and a permeated liquid that is filtered by said separation membrane from a raw liquid supplied via a raw liquid flow path formed by said supply side flow path material is guided to said central pipe via said permeation side flow path material, comprising:

a power generating section that generates electric power by using said raw liquid or said permeated liquid, wherein said power generating section generates electric power by a fluid pressure of said liquid said power generating section comprising a rotor disposed in said raw liquid flow path, wherein said rotor rotates by the fluid pressure of said liquid, wherein said power generating section generates electric power on the basis of rotation of said rotor; and a capacitor section that stores the electric power supplied from said power generating section.

5. A spiral type membrane filtering device comprising the spiral type membrane element according to claim 4.

* * * * *